US011832756B2

(12) United States Patent
Rapparini et al.

(10) Patent No.: US 11,832,756 B2
(45) Date of Patent: Dec. 5, 2023

(54) METHOD AND SYSTEM FOR PRODUCING BEVERAGES

(71) Applicant: Aroma System S.r.l., Bologna (IT)

(72) Inventors: Gino Rapparini, Bologna (IT); Maurizio Generali, Bologna (IT)

(73) Assignee: AROMA SYSTEM S.R.L., Bologna (IT)

( * ) Notice: Subject to any disclaimer, the term of this patent is extended or adjusted under 35 U.S.C. 154(b) by 280 days.

(21) Appl. No.: 15/644,200

(22) Filed: Jul. 7, 2017

(65) Prior Publication Data

US 2018/0332995 A1    Nov. 22, 2018

(30) Foreign Application Priority Data

May 19, 2017   (IT) .................. 102017000054650

(51) Int. Cl.
| | |
|---|---|
| *A47J 31/34* | (2006.01) |
| *A47J 31/06* | (2006.01) |
| *A47J 31/36* | (2006.01) |
| *B65D 85/804* | (2006.01) |
| *A23F 5/26* | (2006.01) |
| *A47J 31/40* | (2006.01) |
| *B65D 77/20* | (2006.01) |

(52) U.S. Cl.
CPC ............... *A47J 31/34* (2013.01); *A23F 5/262* (2013.01); *A47J 31/0668* (2013.01); *A47J 31/368* (2013.01); *A47J 31/3666* (2013.01); *A47J 31/407* (2013.01); *B65D 77/202* (2013.01); *B65D 85/8061* (2020.05)

(58) Field of Classification Search
CPC ...... A47J 31/34; A47J 31/407; A47J 31/0668; A47J 31/368; A47J 31/3666; B65D 77/202; B65D 85/8043; A23F 5/262
See application file for complete search history.

(56) References Cited

U.S. PATENT DOCUMENTS

| | | | |
|---|---|---|---|
| 4,550,024 A * | 10/1985 | le Granse ........... | A47J 31/0642 426/77 |
| D726,006 S | 4/2015 | Rapparini ....................... | D9/434 |
| D730,734 S | 6/2015 | Rapparini ....................... | D9/454 |
| 2005/0183578 A1* | 8/2005 | Mandralis ........... | A47J 31/4492 99/279 |

(Continued)

FOREIGN PATENT DOCUMENTS

| | | | | |
|---|---|---|---|---|
| CA | 2649228 | 11/2007 | | |
| DE | 3504441 A1 * | 8/1986 | ......... | B65D 85/8043 |

(Continued)

*Primary Examiner* — Viren A Thakur
(74) *Attorney, Agent, or Firm* — Fattibene and Fattibene, LLC; Paul A. Fattibene

(57) ABSTRACT

Described are a method and a system for the production of beverages by means of a capsule (C1, C2, C3, C4) and a container (A) adapted to house the capsule during the production. The capsule comprises a reinforcement ring (102, 202, 302, 402) which comprises a side wall (103, 203, 303, 403) and a ledge (104, 204, 304, 404) protruding from the side wall. A seal is provided between at least a portion of the side wall of the reinforcement ring and at least a portion of the inner surface (17) of the side wall (5) of the container so as to avoid the leak of the beverage from the interface between the reinforcement ring and the container.

15 Claims, 10 Drawing Sheets

(56) References Cited

U.S. PATENT DOCUMENTS

| | | | |
|---|---|---|---|
| 2009/0017177 A1* | 1/2009 | Yoakim | A47J 31/0678 426/431 |
| 2009/0223373 A1 | 9/2009 | Kollep et al. | 99/279 |
| 2011/0168029 A1* | 7/2011 | Fulco | A47J 31/0668 99/295 |
| 2011/0189350 A1* | 8/2011 | Van Belleghem | B65D 85/8064 99/289 R |
| 2011/0247975 A1* | 10/2011 | Rapparini | B65D 85/8043 210/321.6 |
| 2011/0315021 A1* | 12/2011 | Eichler | B65D 85/8043 99/295 |
| 2012/0210878 A1* | 8/2012 | Mariller | B65D 85/8043 99/295 |
| 2012/0231123 A1* | 9/2012 | Kamerbeek | A47J 31/368 426/112 |
| 2012/0251693 A1* | 10/2012 | Kamerbeek | A47J 31/3628 426/431 |
| 2012/0269933 A1 | 10/2012 | Rapparini | 426/82 |
| 2012/0272830 A1* | 11/2012 | Gugerli | A47J 31/0668 99/295 |
| 2013/0305932 A1* | 11/2013 | Epars | A47J 31/0668 99/295 |
| 2013/0340626 A1* | 12/2013 | Oh | A23F 3/18 426/115 |
| 2015/0151903 A1* | 6/2015 | Bartoli | B65D 85/8043 426/115 |
| 2015/0257582 A1* | 9/2015 | Oh | A47J 31/407 426/431 |
| 2015/0314953 A1* | 11/2015 | Mariller | A47J 31/407 426/115 |
| 2015/0352044 A1* | 12/2015 | Benson | A23L 2/39 424/725 |
| 2016/0353919 A1* | 12/2016 | Burrows | A23F 5/262 |
| 2017/0210534 A1 | 7/2017 | Rapparini | B65D 77/22 |
| 2019/0077588 A1* | 3/2019 | Bartel | B65D 85/8043 |

FOREIGN PATENT DOCUMENTS

| | | | |
|---|---|---|---|
| EP | 0361569 A1 * | 4/1990 | |
| EP | 1839543 | 10/2007 | |
| EP | 1849715 | 10/2007 | |
| WO | WO-2013032331 A1 * | 3/2013 | A47J 31/0689 |
| WO | WO-2015138045 A1 * | 9/2015 | A47J 31/0668 |

* cited by examiner

METHOD AND SYSTEM FOR PRODUCING BEVERAGES

FIELD OF THE INVENTION

The present invention relates to a method for the production of beverages, such as espresso coffee or the like, and a system for the production of beverages. More particularly, the present invention relates to a method for the production of beverages through the use of a capsule and a system for the production of beverages comprising a container adapted to house the capsule during the production of the beverage. Even more particularly, the present invention relates to a method for the production of beverages through the use of a capsule made of a filtering material comprising a reinforcement ring and a system for the production of beverages comprising a container adapted to house such a capsule during the production of the beverage.

PRIOR ART

A wide range of methods and systems for the production of beverages exit in the prior art which use capsules and a container or housing adapted to house the capsule during the production of the beverage. For example, the container may be an integral or removable component of a machine for the production of beverages by means of capsules.

Known types of systems frequently use non-filtering capsules that must be, for example, pierced to allow the exit of the beverage from the capsule body.

There is also a wide range of capsules of filtering material comprising reinforcement rings in the prior art. Examples of such capsules can be found in the European Patent Application published under number EP 2555997 A1 and in Italian patent No. 1,424,591 (Application Number 102014902266714). Others examples of reinforcement rings for capsules for the production of beverages can be found in the American patent application published under number US 2011/0247975 A1, in the PCT application published under number WO 2015/186035 A1 and in the American design patents published under number US D730,734 S and US D726,006 S.

Unfortunately, the prior art capsules made of filtering material and comprising reinforcement rings are not always adapted to be housed in the systems for the production of beverages available on the market.

More particularly, the capsules of known type, made of filtering material and comprising reinforcement rings are not configured so as to prevent the beverage from leaking from undesired parts of the container in which they are housed, for example from the interface between the reinforcement ring and the inner wall of the container or more particularly, from the upper edge thereof, during the production of the beverage. This may happen, for example, both because the reinforcement ring of the capsule does not rest on the inner wall of the container because it is too small, and because the upper edge of the container has a profile that does not match with the shape of the reinforcement ring.

The leak of the beverage from undesired areas of the system is problematic, both because it can soil the system, thus damaging it, and because it can compromise the quality and/or quantity of beverage produced.

The object of the present invention is to solve the aforementioned problems, so as to provide capsules made of filtering material and comprising reinforcement rings which can be effectively used.

SUMMARY

The present invention is based on the idea of providing a seal between at least a portion of the side wall of the reinforcement ring and at least a predefined portion of the inner surface of the side wall of the container so as to avoid the leak of the beverage from the interface between the reinforcement ring and the container. The portion of the side wall of the reinforcement ring that contributes to the seal may correspond, for example, to a fraction of the side wall of the ring, for example the lower portion, or it may correspond to the entire side wall. Moreover, the seal may for example be made only between at least a portion of the side wall of the reinforcement ring and at least a predefined portion of the inner surface of the side wall of the container, i.e. without further elements of the system to contribute to the seal. The term "side wall of the reinforcement ring" refers to the entire element of the reinforcement ring which is connected to the protruding edge of the reinforcement ring. The side wall of the reinforcement ring thus comprises an outer surface, facing towards the outside of the ring, an inner surface, facing towards the inside of the ring, and a bottom which connects the inner surface to the outer surface. The height of the side wall of the reinforcement ring is defined as the distance between the bottom of the side wall and the corner from which the protruding edge of the ring protrudes. The thickness of the side wall of the reinforcement ring is defined by the distance between the inner surface and the outer surface and may be uniform or non-uniform along the height of the side wall.

According to an embodiment of the present invention, provided is a method for the production of a beverage by means of a system comprising a capsule and a container adapted to house the capsule during the production; the capsule comprises a capsule body made of filtering material, such as filter paper or thermoformable filtering material, adapted to form a containment volume for the product used to obtain the desired beverage, for example ground coffee, and a reinforcement ring comprising a side wall and a ledge protruding from the side wall; the container comprising a side wall and a bottom, forming a compartment adapted to house the capsule during the production; the method comprising the following step: providing a seal between at least a portion of the side wall of the reinforcement ring and a predefined portion of the inner surface of the side wall of the container, so as to avoid the leak of the beverage from the interface between the reinforcement ring and the container. The seal may for example be provided between a portion of the outer surface of the side wall of the ring and a predefined portion of the inner surface of the side wall of the container. Additionally, the seal may for example be provided between the entire outer surface of the side wall of the ring and a predefined portion of the inner surface of the side wall of the container. Moreover, the seal may for example be provided between a portion of the bottom of the side wall of the ring and a predefined portion of the inner surface of the side wall of the container. Moreover, the seal may be provided between the entire bottom of the side wall of the ring and a predefined portion of the inner surface of the side wall of the container. Combinations of the above examples are also possible, for example, in which the seal is provided both between the outer surface of the side wall of the ring (or a portion thereof) and a predefined portion of the inner surface of the side wall of the container, and between the bottom of the side wall of the ring (or a portion thereof) and a further predefined portion of the inner surface of the side wall of the container. The seal may also be provided, for example, by means of the corner between the bottom and the outer surface of the side wall of the ring. This corner may for example make contact and seal with a predefined portion of the inner surface of the side wall of the container. According to the present invention, the inner surface of the side wall of the container may be smooth or may be textured, for example having one or more steps or one or more projections, edges or the like. The surface or surfaces of each of these elements are still part of the inner surface of the side wall of the container. Providing the seal directly between the side wall of the reinforcement ring and the inner surface of the side wall of the container effectively prevents the beverage from leaking, for example, from the upper edge of the container, whatever shape it has, making sure that the external parts the system will not be soiled and/or damaged and that all the produced beverage can be collected in an appropriate container to drink it.

According to a further embodiment of the present invention, provided is a method for the production of a beverage wherein the seal is only provided between at least a portion of the side wall of the reinforcement ring and a predefined portion of the inner surface of the side wall of the container so as to avoid the leak of the beverage from the interface between the reinforcement ring and the container. This means that only the side wall of the reinforcement ring (or a portion thereof) and the predefined portion of the inner surface of the side wall of the container contribute to the seal. Other elements of the system, for example the protruding edge of the reinforcement ring or the upper edge of the container do not contribute to the seal. In this way, it is not necessary to form a seal with the upper edge of the container and, therefore, the shape of the protruding edge of the reinforcement ring or the shape of the upper edge of the container may vary as desired, since the seal is still ensured by the side wall thereof.

According to a further embodiment of the present invention, provided is a method for the production of a beverage wherein the seal is provided between the lower portion of the side wall of the reinforcement ring and the inner surface of the side wall of the container. As a result, the reinforcement ring is more versatile since the size and shape of the upper part of the side wall and of the protruding edge may vary as desired since the seal is still ensured by the lower portion of the side wall regardless of the configuration of the protruding edge and/or of the container. For example, the lower portion is a portion below the mid-height of the side wall.

According to a further embodiment of the present invention, provided is a method for the production of a beverage further comprising the following step: enclosing the capsule, during the production of the beverage, in the compartment adapted to house the capsule during the production, by means of a closing element. This ensures that the capsule remains within the container adapted to house it, during the production of the beverage. Preferably, the step of enclosing the capsule in the compartment adapted to house the capsule during the production by means of a closing element comprises the sub-step of exerting a force on the capsule in the container so as to ensure the contact and thus the seal between the side wall of the reinforcement ring and the inner surface of the side wall of the container. In other words, through the closing element it is possible to preferably push the capsule so as to ensure the contact and thus the seal between the side wall of the reinforcement ring and the inner surface of the side wall of the container. According to a further embodiment of the present invention, provided is a method for the production of a beverage wherein the closing element rests on the protruding ledge of the reinforcement ring during the production.

According to a further embodiment of the present invention, provided is a method for the production of a beverage further comprising the following step: piercing the sealing element of the capsule by a first piercing element. If the capsule is closed by a sealing element, piercing the sealing element allows subsequently letting water under pressure enter into the capsule body.

According to a further embodiment of the present invention, provided is a method for the production of a beverage further comprising the following step: introducing water under pressure into the capsule body.

According to a further embodiment of the present invention, provided is a method for the production of a beverage further comprising the following step: exit of the beverage from the capsule body and collection of the same into the compartment adapted to house the capsule during the production.

According to a further embodiment of the present invention, provided is a method for the production of a beverage further comprising the following step: collecting the beverage in a dedicated container, such as a cup. After being properly collected, the beverage can then be drunk.

According to a further embodiment of the present invention, provided is a system for the production of a beverage comprising a capsule and a container adapted to house the capsule during the production; the capsule comprising a capsule body made of filtering material, such as filter paper or thermoformable filtering material, adapted to form a containment volume for the product used to obtain the desired beverage, for example ground coffee, and a reinforcement ring comprising a side wall and a ledge protruding from the side wall; the container comprising a lateral surface and a bottom, forming the compartment adapted to house the capsule during the production; the system being such that the side wall of the reinforcement ring is configured so that at least a portion of the side wall forms a seal with a predefined portion of the inner surface of the side wall of the container, so as to prevent the leak of the beverage from the interface between the reinforcement ring and the container. The seal may for example be provided between a portion of the outer surface of the side wall of the ring and a predefined portion of the inner surface of the side wall of the container. Additionally, the seal may for example be provided between the entire outer surface of the side wall of the ring and a predefined portion of the inner surface of the side wall of the container. Moreover, the seal may for example be provided between a portion of the bottom of the side wall of the ring and a predefined portion of the inner surface of the side wall of the container. Moreover, the seal may be provided between the entire bottom of the side wall of the ring and a predefined portion of the inner surface of the side wall of the container. Combinations of the above examples are also possible, for example, in which the seal is provided both between the outer surface of the side wall of the ring (or a portion thereof) and a predefined portion of the inner surface of the side wall of the container, and between the bottom of the side wall of the ring (or a portion thereof) and a further predefined portion of the inner surface of the side wall of the container. The seal may also be provided, for example, by means of the corner between the bottom and the outer surface of the side wall of the ring. This corner may for example make contact and seal with a predefined portion of the inner surface of the side wall of the container. According to the present invention, the inner surface of the side wall of the container may be smooth or may be textured, for example having one or more steps or one or more projections, edges or the like. The surface or surfaces of each of these elements are still part of the inner surface of the side wall of the container. This prevents the beverage from leaking, for example, from the upper edge of the container, whatever shape it has, making sure that the external parts of the system will not be soiled and/or damaged and that all the produced beverage can be collected in an appropriate container to drink it.

According to a further embodiment of the present invention, provided is a system for the production of a beverage wherein only the side wall of the reinforcement ring (or a portion thereof) is configured so as to form a seal with the predefined portion of the inner surface the side wall of the container, so as to prevent leaks of the beverage from the interface between the reinforcement ring and the container. This means that only the side wall of the reinforcement ring (or a portion thereof) and the predefined portion of the inner surface of the side wall of the container contribute to the seal. Other elements of the system, for example the protruding edge of the reinforcement ring or the upper edge of the container do not contribute to the seal. In this way, it is not necessary to form a seal with the upper edge of the container and, therefore, the shape of the protruding edge of the reinforcement ring or the shape of the upper edge of the container may vary as desired, since the seal is still ensured by the side wall thereof.

According to a further embodiment of the present invention, provided is a system for the production of a beverage wherein the seal is provided between the lower portion of the side wall of the reinforcement ring and the inner surface of the side wall of the container. As a result, the reinforcement ring is more versatile since the size and shape of the upper part of the side wall thereof and of the protruding edge thereof are independent of the size and shape of the lower portion of the side wall thereof and of the size and shape of the container. For example, the lower portion is a portion below the mid-height of the side wall.

According to a further embodiment of the present invention, provided is a system for the production of a beverage wherein the outer diameter of the side wall of the reinforcement ring or at least of the lower portion thereof corresponds to the diameter of the inner surface of the side wall of the container at least in a predefined portion of the inner surface, so that there is a seal between the side wall of the reinforcement ring and the inner surface of the side wall of the container.

According to a further embodiment of the present invention, provided is a system for the production of a beverage wherein the side wall of the reinforcement ring, or at least the lower portion thereof, has an inclination corresponding to the inclination of at least a predefined portion of the inner surface of the side wall of the container so as to provide a seal with the inner surface.

According to a further embodiment of the present invention, provided is a system for the production of a beverage wherein the profile of the outer wall of the side wall of the reinforcement ring or at least of the lower portion thereof corresponds to the profile of the inner surface of the side wall of the container at least in a predefined portion of the inner surface, so that there is a seal between the side wall of the reinforcement ring and the inner surface of the side wall of the container. For example, if the inner side wall of the container includes a step or a thread or an interlocking or is cone-shaped, the side wall of the reinforcement ring may be made with a step or a thread or an interlocking or cone-shaped, so as to form the seal.

According to a further embodiment of the present invention, provided is a system for the production of a beverage wherein the side wall and the protruding ledge of the capsule are made as a single body, for example using a hot and/or injection molding process. This reduces the production costs and times of the ring.

According to a further embodiment of the present invention, provided is a system for the production of a beverage wherein the capsule comprises a sealing element. According to a further embodiment of the present invention, provided is a system for the production of a beverage wherein the sealing element is welded to the protruding ledge of the reinforcement ring.

According to a further embodiment of the present invention, provided is a system for the production of a beverage wherein the sealing element is peelable. In this way, it may be removed, if necessary, before using the capsule.

According to a further embodiment of the present invention, provided is a system for the production of a beverage wherein the side wall of the container comprises one or more recesses, adapted to facilitate the insertion and/or removal of the capsule into/from the container. This facilitates the use of the capsule.

According to a further embodiment of the present invention, provided is a system for the production of a beverage wherein the seal is provided between the side wall of the reinforcement ring and the inner surface of the side wall of the container, underneath the one or more recesses. This ensures the seal irrespective of the shape of the recesses.

According to a further embodiment of the present invention, provided is a system for the production of a beverage comprising a closing element adapted to enclose the capsule, during the production of the beverage, in the compartment adapted to accommodate the capsule during the production. This ensures that the capsule remains within the container adapted to house it, during the production of the beverage. Preferably, the closing element may be configured so as to exert a force on the capsule in the container so as to ensure the contact and thus the seal between the side wall of the reinforcement ring and the inner surface of the side wall of the container. In other words, the closing element may be configured so as to push the capsule so as to ensure the contact and thus the seal between the side wall of the reinforcement ring and the inner surface of the side wall of the container.

According to a further embodiment of the present invention, provided is a system for the production of a beverage comprising a first piercing element adapted to pierce the sealing element. If the capsule is closed by a sealing element, piercing the sealing element allows subsequently letting water under pressure enter inside the capsule body.

According to a further embodiment of the present invention, provided is a system for the production of a beverage comprising a dispensing tube adapted to introduce water under pressure into the capsule body.

According to a further embodiment of the present invention, provided is a system for the production of a beverage comprising an outlet conduit for the exit of the beverage from the container and the collection of the same into a dedicated container, such as a cup.

According to a further embodiment of the present invention, provided is a machine for the production of beverages by means of capsules comprising a system according to one or more of the possible embodiments of the present invention listed above. The container adapted to house the capsule may for example be an integral component of the machine. Alternatively, the container may be removable and/or interchangeable.

BRIEF DESCRIPTION OF THE FIGURES

The present invention will be described with reference to the accompanying drawings in which the same reference numerals and/or signs indicate the same parts and/or similar and/or corresponding parts of the system.

FIG. 4A schematically shows a detail of the system shown in FIG. 4.

FIG. 6A schematically shows a detail of the system shown in FIG. 6.

FIG. 8A schematically shows a detail of the system shown in FIG. 8.

FIG. 9A schematically shows a detail of the system shown in FIG. 9.

FIG. 10A schematically shows a detail of the system shown in FIG. 10.

DETAILED DESCRIPTION

Hereinafter, the present invention is described with reference to particular embodiments, as illustrated in the accompanying drawings. However, the present invention is not limited to the particular embodiments described in the following detailed description and shown in the figures, but rather the embodiments described merely exemplify the various aspects of the present invention, the object of which is defined by the claims. Further modifications and variations of the present invention will become apparent to the man skilled in the art.

Figure 1:
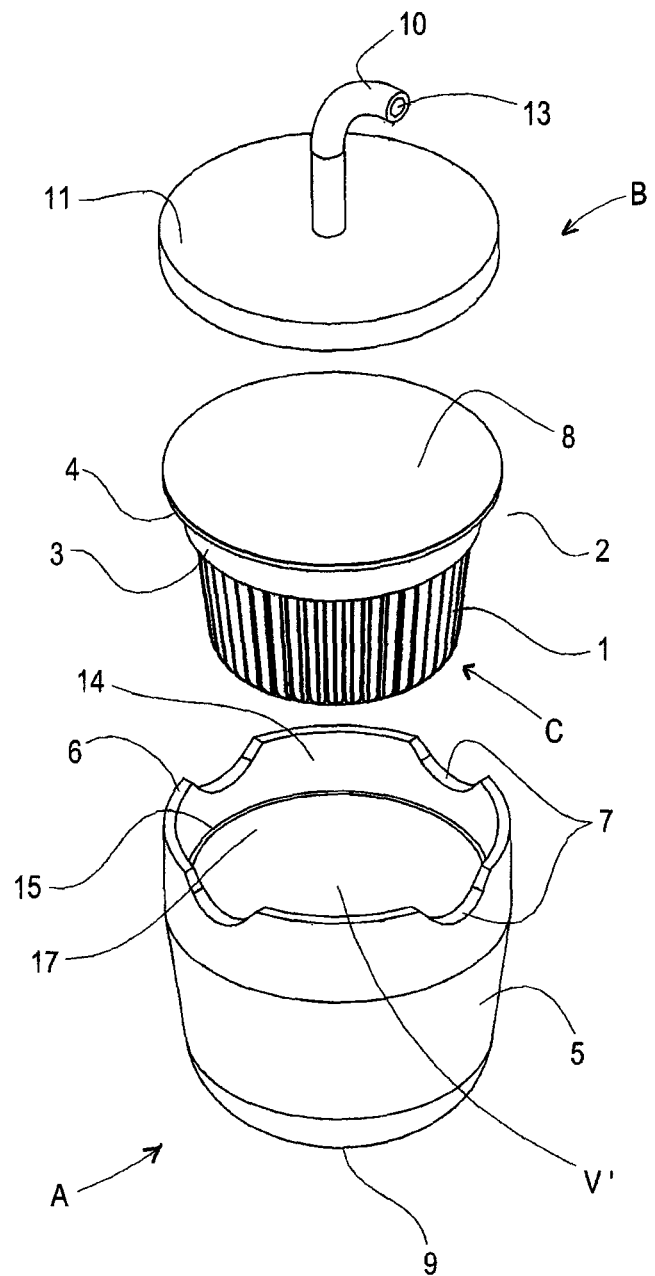
FIG. 1 schematically shows a 3D view of the system for the production of beverages, according to the prior art.

FIG. 1 schematically shows a 3D view of the system for the production of beverages, according to the prior art. The system comprises a capsule C, a container A adapted to house the capsule C during the production of the beverage and a closing element B.

The system described is a typical example of a system for producing beverages, known from the prior art, which uses a capsule made of filtering material comprising a reinforcement ring, inserted into a container designed for non-filtering capsules that must be, for example, pierced to allow the exit of the beverage from the capsule body.

Capsule C comprises a capsule body 1 made of filtering material, adapted to form the containment volume V for the product used to obtain the desired beverage, such as ground coffee.

Capsule C comprises a reinforcement ring 2 comprising a side wall 3 and a ledge 4 protruding from the side wall 3.

Capsule C further comprises a sealing element 8. The sealing element 8 is welded to the protruding ledge 4 of the reinforcement ring 2, for example heat-welded.

The container A is adapted to house the capsule C during the production of the beverage.

The container A comprises a side wall 5 and a bottom 9, forming a compartment V' adapted to house the capsule C during the production. The side wall 5 of the container A comprises an inner surface 17, facing towards the compartment V'. The inner surface 17 of the side wall 5 of the container A has an inclination a with respect to the bottom 9.

Hereinafter, inner surfaces are all those surfaces facing towards the compartment V', thus towards the inside of the container A, and outer surfaces are those facing in the opposite direction.

The container A further comprises an upper edge 6. The upper edge 6 comprises four recesses 7 adapted to facilitate the insertion and/or removal of the capsule C into and from the container A.

The inner surface 17 of the side wall 5 of the container A comprises a step 21 comprising a horizontal portion 15 and an upper vertical portion 14. The upper vertical portion 14 is that circular crown extending from the horizontal portion 15 to the lower end of recesses 7 of the edge 6. The container A further comprises an outlet tube 12 adapted to let the beverage exit from the container A so that it can be collected in a suitable container, such as a cup T, not shown in the figure.

The container A may finally comprise a second piercing element 20 adapted to pierce the capsule body 1 of the capsule C. The second piercing element may be contained in the outlet tube 12 or may, for example, be shaped as a hollow needle or the like.

The closing element B is adapted to enclose the capsule C during the production of the beverage in the compartment V' adapted to house the capsule C during the production. The closing element B comprises a cover 11, adapted to rest on the sealing element 8, during the production of the beverage and a dispensing tube 10. The closing element B further comprises a first piercing element adapted to pierce the sealing element C and a conduit 13 through which the water dispensed under pressure for the formation of the beverage flows.

Figure 2:
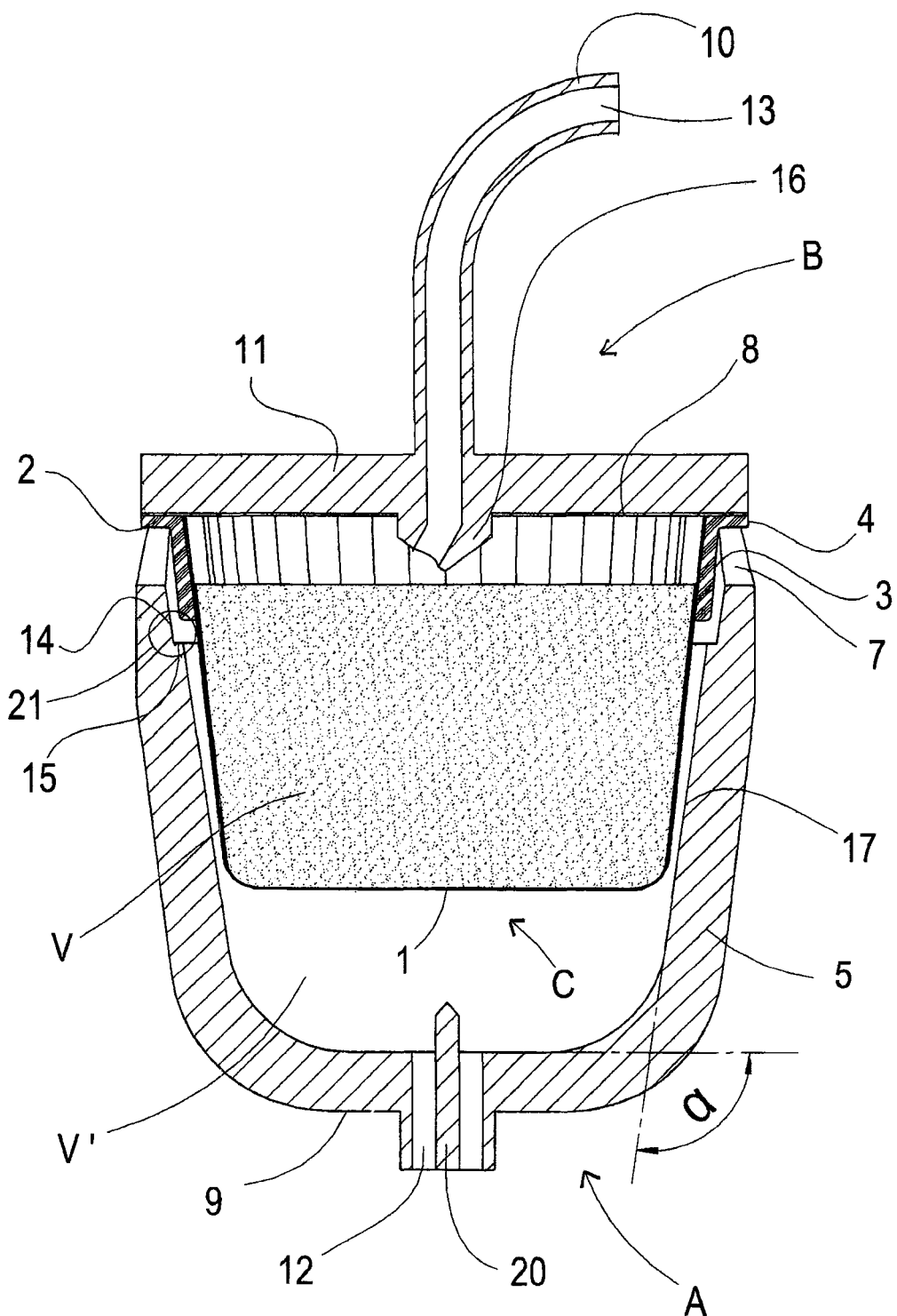
FIG. 2 schematically shows a sectional view of the system for the production of beverages shown in FIG. 1, in a use step.

FIG. 2 schematically shows a sectional view of the system for the production of beverages shown in FIG. 1 in a use step.

In this figure, the capsule C is housed in the compartment V' of the container A and the closing element B is resting on the sealing element 8 of the capsule C. The first piercing element 16 has pierced the sealing element 8 so that the water dispensed under pressure may subsequently enter into the capsule C through the conduit 13.

The figure shows that the protruding ledge 4 of the reinforcement ring 2 rests on the upper edge 6 of the container A and that the lower portion of the side wall 3 of the reinforcement ring 2 is not in contact with the inner surface 17 of the container A. More specifically, the lower portion of the side wall 3 is neither in contact with the upper vertical portion 14 nor with the horizontal portion 15 of the step 21 of the inner surface 17 of the side wall 5 of the container A.

The second piercing element 20 is not in contact with the capsule body 1 of filtering material.

Figure 3:
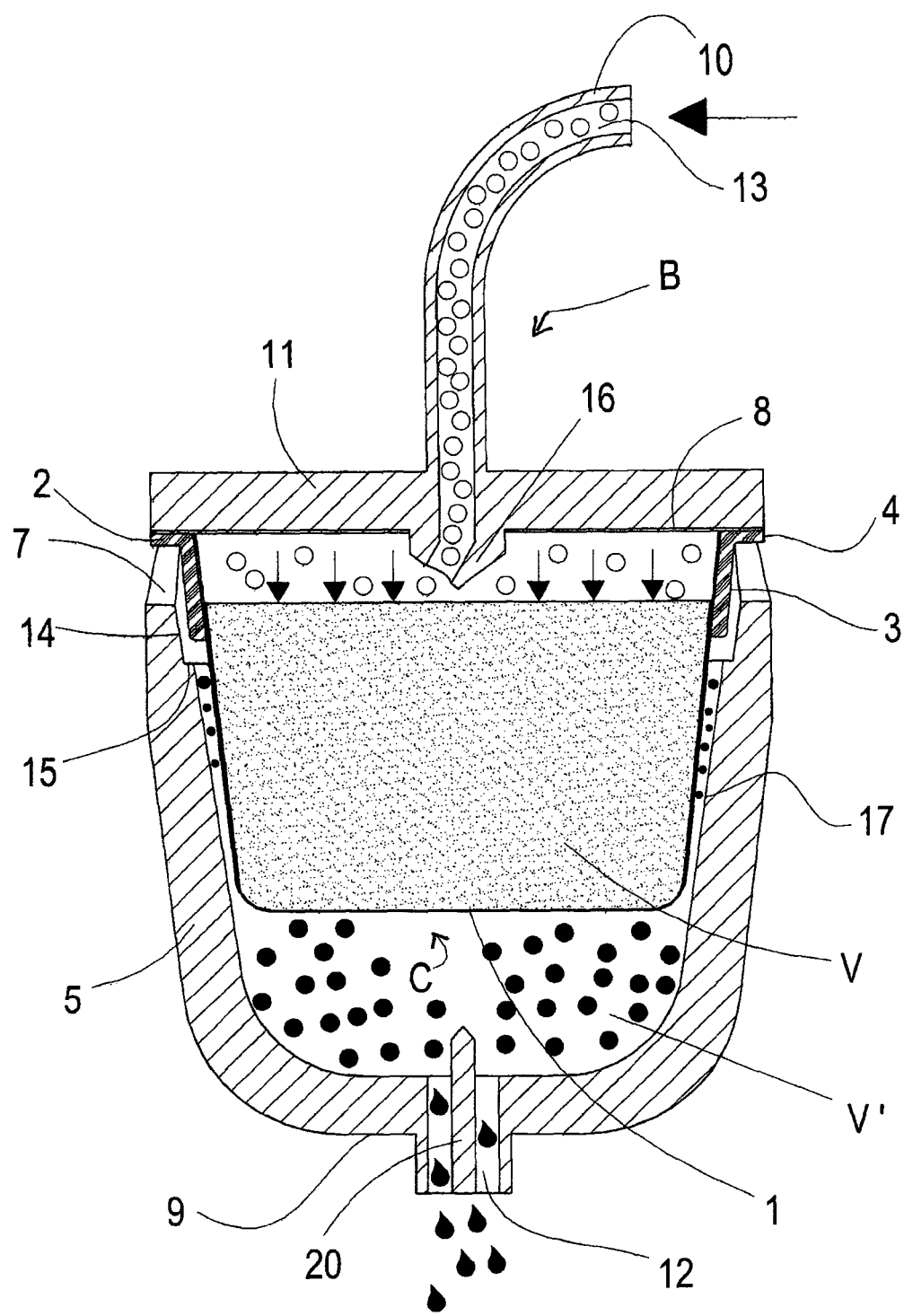
FIG. 3 schematically shows a sectional view of the system for the production of beverages shown in FIG. 1, in a further use step.

FIG. 3 schematically shows a sectional view of the system for the production of beverages shown in FIG. 1, in a further use step.

The figure shows how the water dispensed under pressure enters through the conduit 13 in the containment volume V of the capsule C, which contains the product for the production of the beverage and how the beverage, exiting from the filtering capsule body 1, collects into the compartment V', and then exits through the outlet tube 12.

Figure 4:
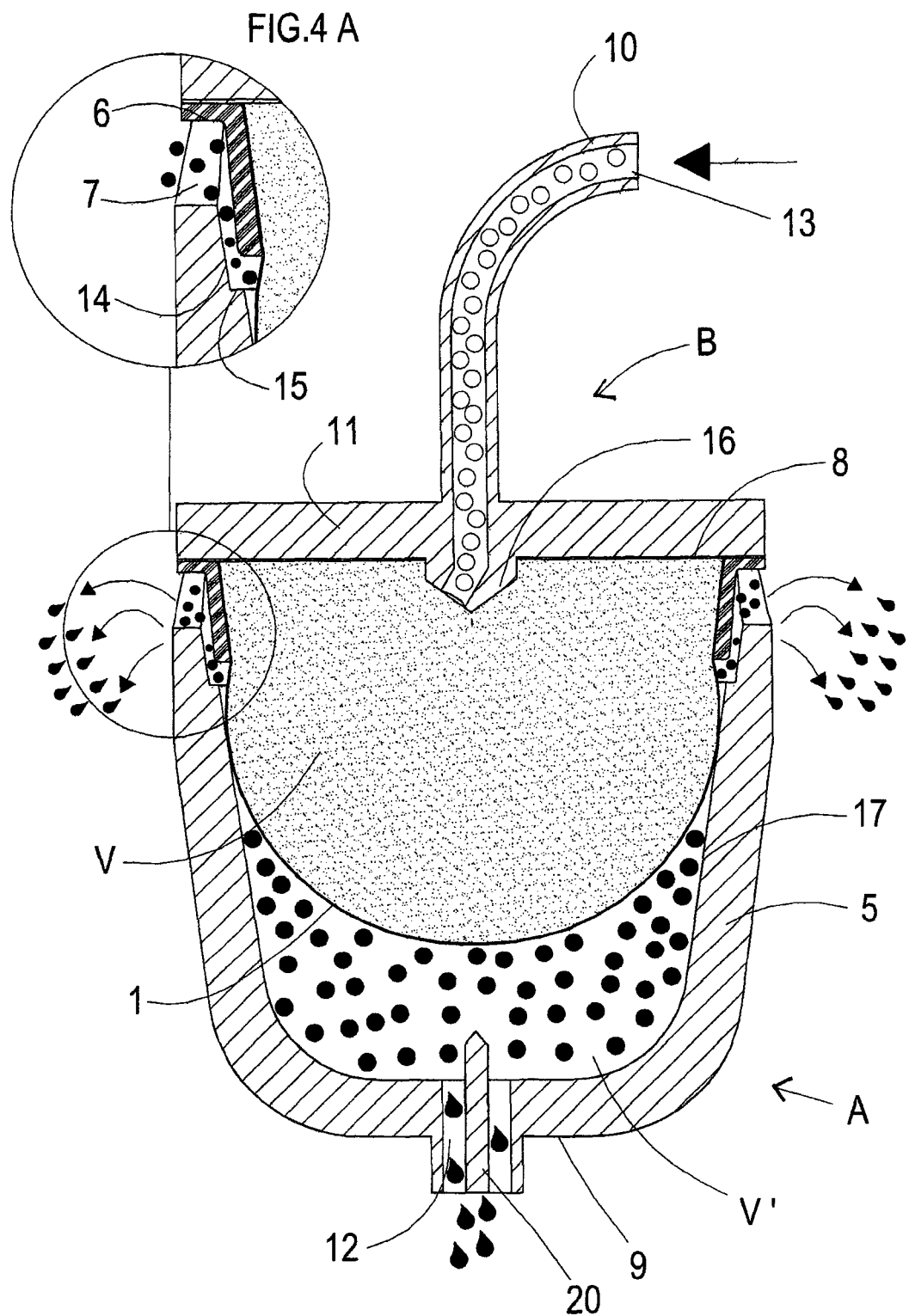
FIG. 4 schematically shows a sectional view of the system for the production of beverages shown in FIG. 1, in a further use step.

FIG. 4 schematically shows a sectional view of the system for the production of beverages shown in FIG. 1, in a further use step.

The figure shows how the prolonged dispensing of water under pressure into the filtering capsule body 1 causes deformation thereof due to the resistance to the passage of water by the filtering material of the capsule body 1 and/or by the product for the production of the beverage contained therein.

Due to the deformation of the capsule body 1, however, the resulting beverage comes out not only from the outlet conduit 12 but also undesirably from the recesses 7 of the edge 6.

A possible solution to prevent the deformation of the capsule body 1 due to the water under pressure being dispensed would be to increase the porosity of the filtering material the capsule body 1 is made of. This would decrease the resistance of the capsule body 1 to the pressure of the water being dispensed. However, this solution is not recommended for the significant disadvantages it brings. Increasing the porosity of the capsule body 1, in fact, decreases the quality of the beverage produced, making it overly diluted or excessively speeding the infusion time. This effect is especially undesirable if the system is used, for example, to produce espresso coffee.

The capsule body 1 is not pierced by the second piercing element 20, with which it does not come into contact.

FIG. 4A schematically shows a detail of the system shown in FIG. 4.

The figure shows in detail how the resulting beverage exits from the container A through the recesses 7 of the edge 6.

The exit of the beverage from the recesses 7 is highly undesirable as it soils the exterior of the system, and because the beverage quality will be reduced as the dispensing pressure is partly released onto the recesses 7.

Figure 5:
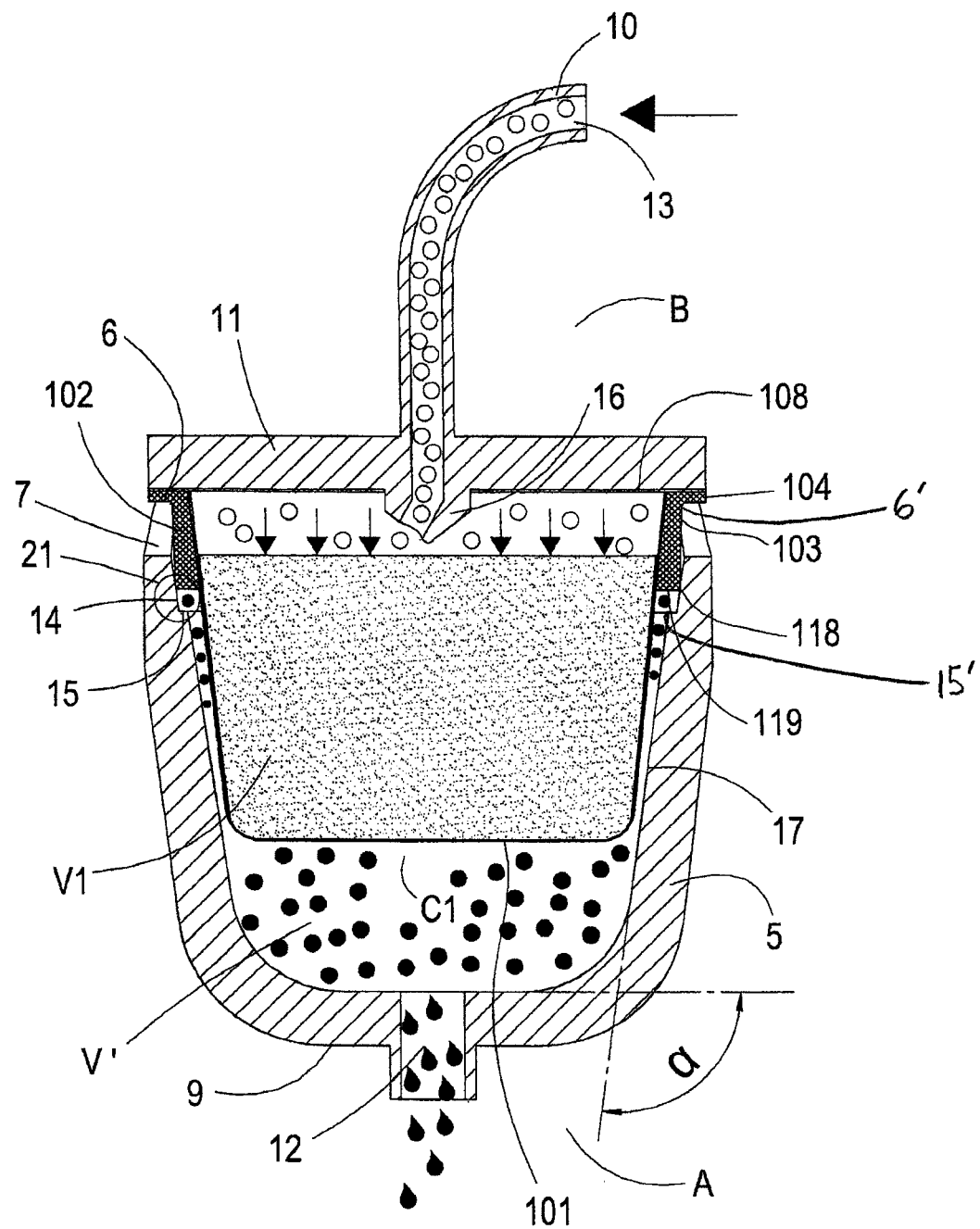
FIG. 5 schematically shows a sectional view of the system for the production of beverages according to an embodiment of the present invention, in a use step.

FIG. 5 schematically shows a sectional view of the system for the production of beverages according to an embodiment of the present invention, in a use step.

The system for the production of a beverage comprises a capsule C1 and a container A adapted to house the capsule C1 during the production; the capsule C1 comprises a capsule body 101 made of filtering material, such as filter paper or thermoformable filtering material, adapted to form a containment volume V1 for the product used to obtain the desired beverage, for example ground coffee, and a reinforcement ring 102 comprising a side wall 103 and a ledge 104 protruding from the side wall 103; the container A comprises a lateral surface 5 and a bottom 9, forming a compartment V' adapted to house the capsule C1 during the production; the system is such that the side wall 103 of the reinforcement ring 102 is configured so as to form a seal with the inner surface 17 of the side wall 5 of the container, so as to prevent the leak of the beverage from the interface between the reinforcement ring 102 and the container A.

The capsule C1 may comprise a sealing element 108. The sealing element 108 may be welded to the protruding ledge 104 of the reinforcement ring 102, for example heat-welded. The sealing element 108 may be peelable, so as to be removed, if necessary, before using the capsule C1.

The container A comprises an upper edge 6. The upper edge 6 having an upper innermost edge 6' may comprise one or more recesses 7, for example adapted to facilitate the insertion and/or removal of the capsule C1 into and from the container A. The one or more recesses 7 may have, for example, a semicircular, triangular, rectangular shape or the like. Alternatively, the edge 6 may have, for example, a wavy shape or the like, so as to form projections and recesses.

The seal is formed between the side wall 103 of the reinforcement ring 102 and the inner surface 17 of the side wall 5 of the container A, underneath the one or more recesses 7. The inner surface 17 of the side wall 5 of the container A, or at least a predefined portion of the inner surface 17 of the side wall 5, may be perpendicular to the bottom 9 or may have an inclination a with respect to it. The inner surface 17 of the side wall 5 of the container A may further be continuous or may comprise, for example, a step 21 comprising a horizontal portion 15 having an innermost edge 15' and an upper vertical portion 14. The upper vertical portion 14 is that circular crown extending from the horizontal portion 15 to the lower end of the one or more recesses 7 of the edge 6. The horizontal portion 15 and the vertical portion 14 are in any case portions of the inner surface 17 of the side wall 5.

The container A further comprises an outlet tube 12 adapted to let the beverage exit from the container A so that it can be collected in a suitable container, such as a cup, not shown in the figure.

The closing element B is adapted to enclose the capsule C1 during the production of the beverage in the compartment V' adapted to house the capsule C1. The closing element B comprises a cover 11, adapted to rest on the sealing element 108, during the production of the beverage, or on the protruding ledge 104 of the reinforcement ring 102, if the sealing element 108 is not present, for example has been peeled prior to the insertion of the capsule C1 into the container A. The closing element B further comprises a dispensing tube 10 and a first piercing element 16 adapted to pierce the sealing element 108 of the capsule C1, if provided. The conduit 13 of the dispensing tube 10 lets the water dispensed under pressure into the capsule for the production of the beverage.

The closing element B may be configured so as to exert a force on the capsule C1 in the container A so as to ensure the contact and thus the seal between the side wall 103 of the reinforcement ring 102 and the inner surface 17 of the side wall 5 of the container. In other words, the closing element B may be configured so as to push the capsule C1 so as to ensure the contact and thus the seal between the side wall 103 of the reinforcement ring 102 and the inner surface 17 of the side wall 5 of the container. The seal between the side wall 103 of the reinforcement ring 102 and the inner surface 17 of the side wall 5 of the container, so as to avoid the leak of the beverage from the interface between the reinforcement ring 102 and the container A, may be formed in several alternative manners.

In any case, however, the seal is formed between the side wall 103 of the reinforcement ring 102 and the inner surface 17 of the side wall 5 of the container A, underneath the one or more recesses 7 of the edge 6.

More specifically, the seal may be made between the entire side wall 103 of the reinforcement ring 102 and the inner surface 17 of the side wall 5, in at least a predefined portion thereof. Alternatively, the seal may be made between the lower portion 118 of the side wall 103 of the reinforcement ring 102 and the inner surface 17 of the side wall 5, in at least a predefined portion thereof.

More specifically, the side wall 103 of the reinforcement ring 102, or only the lower portion 118 thereof, may be made so as to have an outer diameter such as to form a seal with the inner surface 17 of the side wall 5, in at least a predefined portion thereof. This can be achieved either by adapting the size of the entire capsule C1, i.e. the size of the capsule body 101 and of the reinforcement ring 102, to those of the container A, or by increasing or decreasing the thickness of the side wall 103 of the reinforcement ring 102 or only of the lower portion 118 thereof.

Alternatively, the side wall 103 of the reinforcement ring 102, or only the lower portion 118 thereof, may be made so that the outer wall thereof has an inclination with respect to the inner surface 17 of the side wall 5, in at least a predefined portion thereof, so as to form a seal with the same.

Alternatively, the profile of the outer wall of the side wall 103 of the reinforcement ring 102, or only of the lower portion 118 thereof, may be made so as to match the profile of the inner surface 17 of the side wall 5, in at least a predefined portion thereof, so as to form a seal with the same. For example, if the inner surface 17 has the step 21, the side wall 103 may be made with a corresponding step.

In the case shown in FIG. 5, for example, the seal between the side wall 103 of the reinforcement ring 102 and the inner surface 17 of the container A is made so that there is contact between the outer wall of the lower portion 118 of the side wall 103 and the upper vertical portion 14 of the step 21 of the inner surface 17. In this case, the outer surface of the side wall 103 of the reinforcement ring 102 does not have an inclination corresponding to the inclination of the upper vertical wall 14 of the step 21 of the inner surface 17 of the container A, but has such a thickness as to rest against the upper vertical portion 14 of the step 21. Even more specifically, in this case, the corner between the bottom 119 and the outer surface of the side wall 103 of the reinforcement ring 102 contacts and forms the seal with a predefined portion of the inner surface 17 of the side wall 5 of the container A.

FIG. 5 shows how the water under pressure enters through the conduit 13 in the containment volume V1 of the capsule C1, which contains the product for the production of the beverage and the beverage, exiting from the capsule body 101, collects into the compartment V' to exit through the outlet tube 12.

Figure 6:
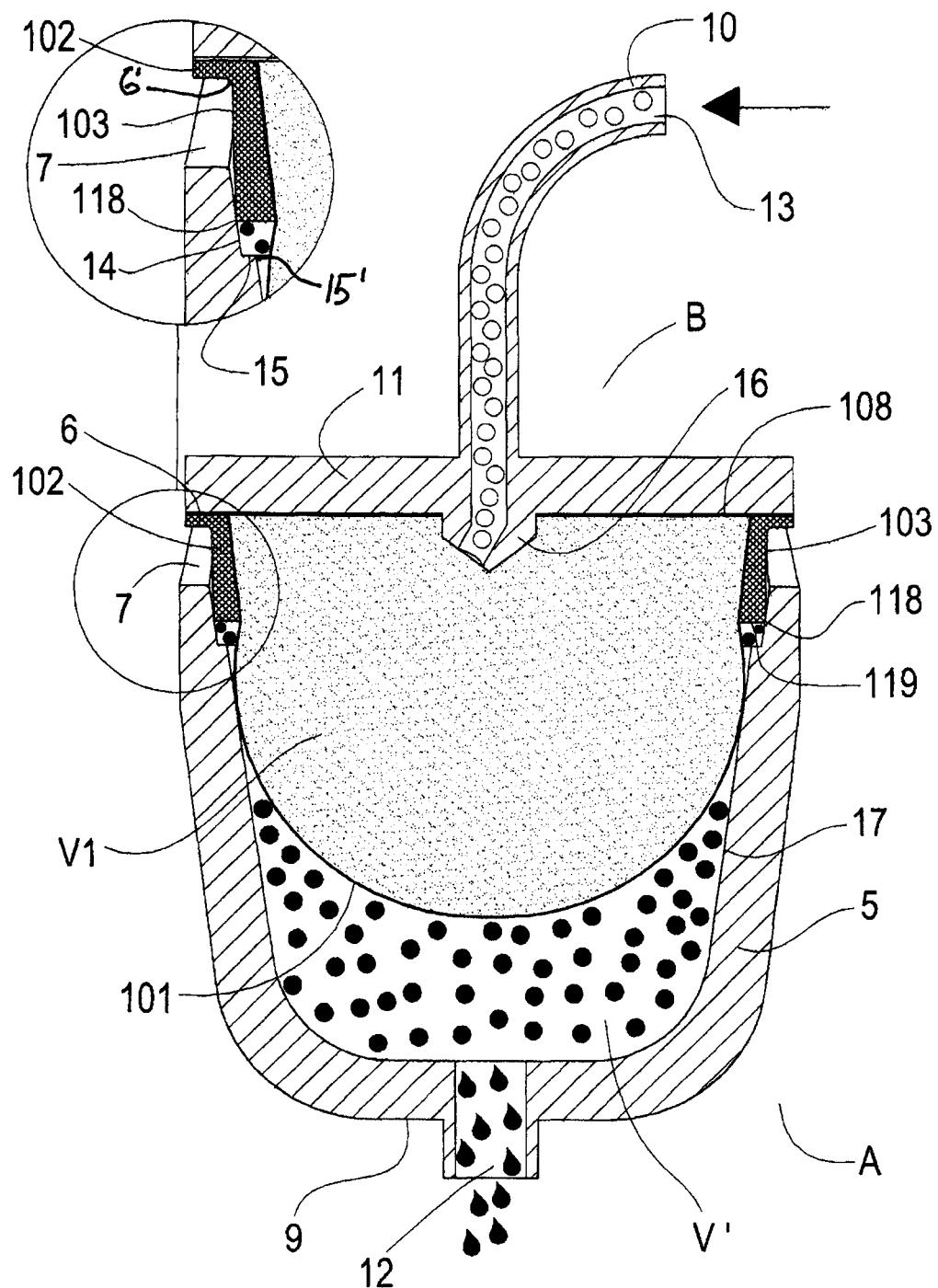
FIG. 6 schematically shows a sectional view of the system for the production of beverages shown in FIG. 5, in a further use step.

FIG. 6 schematically shows a sectional view of the system for the production of beverages shown in FIG. 5, in a further use step.

The figure shows how the prolonged dispensing of water under pressure into the filtering capsule body 101 causes deformation thereof due to the resistance to the passage of water by the filtering material of the capsule body 101 and/or by the product for the production of the beverage contained therein.

Unlike the case shown in FIG. 4, the seal between the side wall 103 of the reinforcement ring 102 and the inner surface 17 of the container A prevents the leak of the beverage from the interface between the reinforcement ring 102 and the container A. More specifically, it prevents the leak of the beverage through the one or more recesses 7 of the edge 6.

FIG. 6A schematically shows a detail of the system shown in FIG. 6.

The figure shows in detail how the resulting beverage does not exit from the interface between the reinforcement ring 102 and the container A, more specifically through the one or more recesses 7 of the edge 6.

Figure 7:
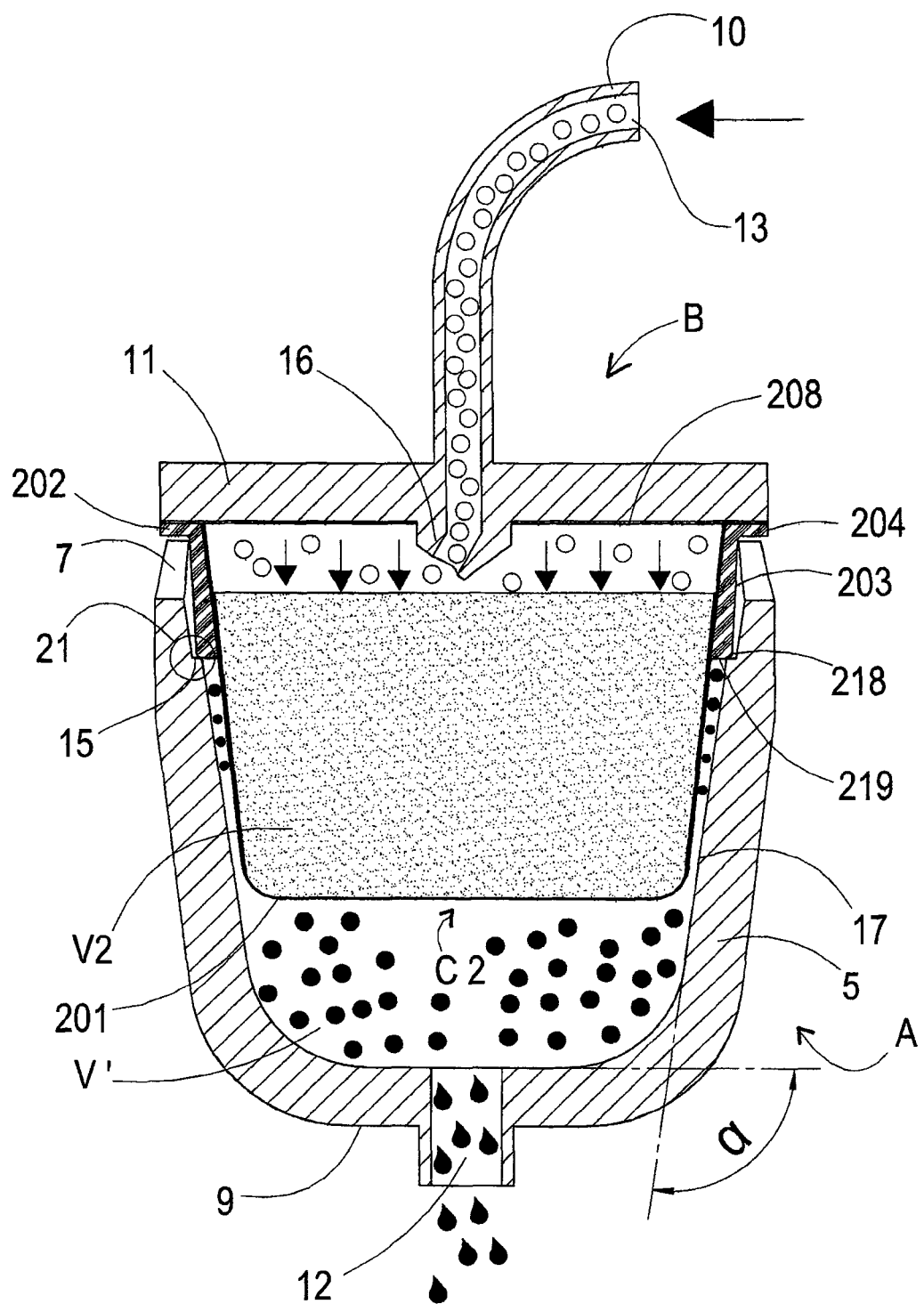
FIG. 7 schematically shows a sectional view of the system for the production of beverages according to a further embodiment of the present invention, in a use step.

FIG. 7 schematically shows a sectional view of the system for the production of beverages according to a further embodiment of the present invention, in a use step.

The system for the production of a beverage comprises a capsule C2 and a container A adapted to house the capsule C2 during the production; the capsule C2 comprises a capsule body 201 made of filtering material, such as filter paper or thermoformable filtering material, adapted to form a containment volume V2 for the product used to obtain the desired beverage, for example ground coffee, and a reinforcement ring 202 comprising a side wall 203 and a ledge 204 protruding from the side wall 203; the container A comprises a lateral surface 5 and a bottom 9, forming a compartment V' adapted to house the capsule C2 during the production; the system being such that the side wall 203 of the reinforcement ring 202 is configured so as to form a seal with the inner surface 17 of the side wall 5 of the container A, so as to prevent the leak of the beverage from the interface between the reinforcement ring 202 and the container A.

In the case shown in FIG. 7, the seal between the side wall 203 of the reinforcement ring 202 and the inner surface 17 of the container A is made so that there is contact between the lower surface or bottom 219 of the side wall 203 and the horizontal portion 15 of the step 21 of the inner surface 17. More specifically, the height of the side wall 203 of the reinforcement ring 202 is such that the lower surface 219 of the side wall 203 rests on the horizontal portion 15 of the step 21 of the inner surface 17 of the container A.

Figure 8:
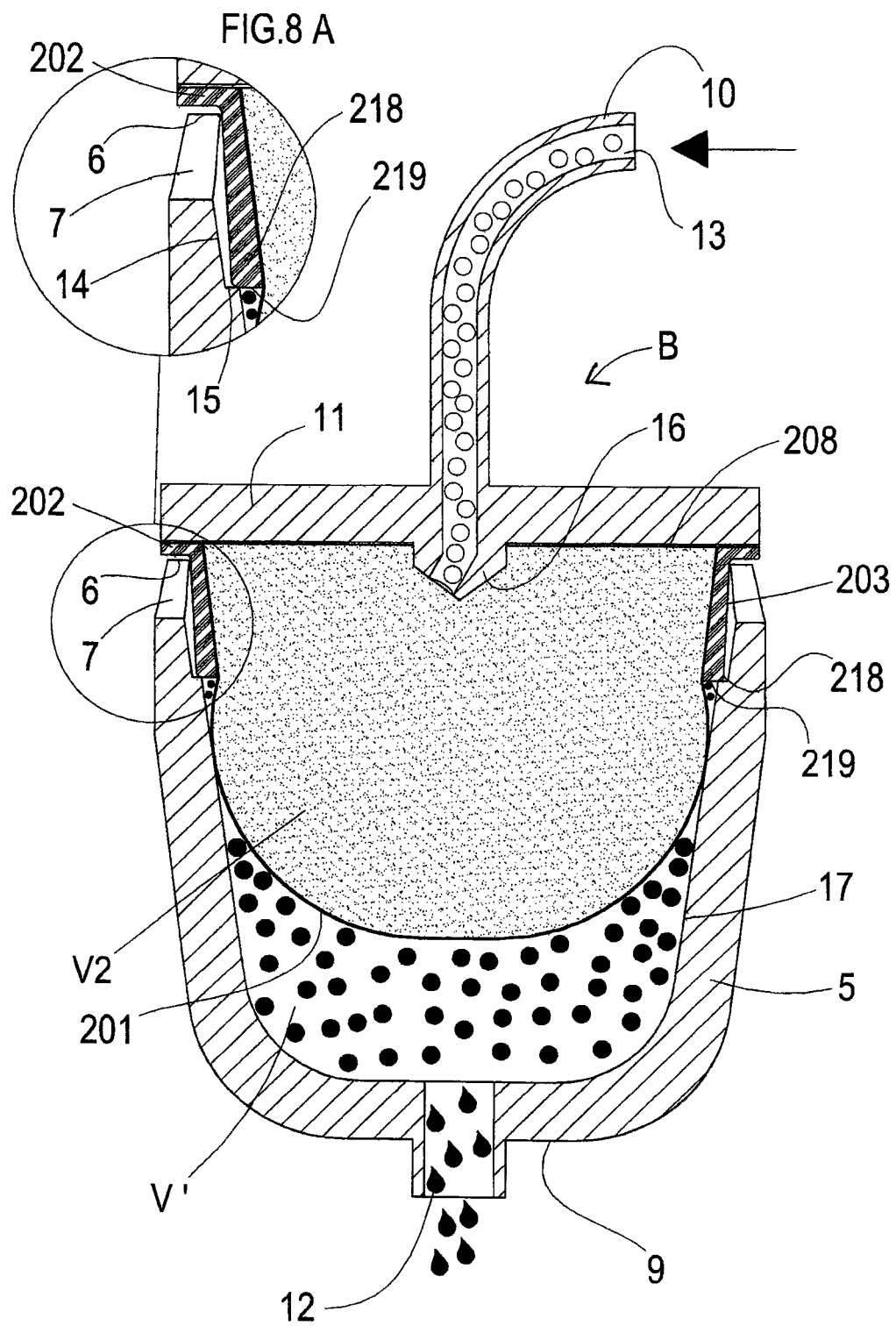
FIG. 8 schematically shows a sectional view of the system for the production of beverages shown in FIG. 7, in a further use step.

FIG. 8 schematically shows a sectional view of the system for the production of beverages shown in FIG. 7, in a further use step.

The figure shows how the prolonged dispensing of water under pressure into the capsule body 201 causes deformation thereof due to the resistance to the passage of water by the filtering material of the capsule body 201 and/or by the product for the production of the beverage contained therein.

Unlike the case shown in FIG. 4, the seal between the side wall 203 of the reinforcement ring 202 and the inner surface 17 of the container A prevents the leak of the beverage from the interface between the reinforcement ring 202 and the container A. More specifically, it prevents the leak of the beverage through the one or more recesses 7 of the edge 6.

FIG. 8A schematically shows a detail of the system shown in FIG. 8.

The figure shows in detail how the resulting beverage does not exit from the interface between the reinforcement ring 202 and the container A. More specifically through the one or more recesses 7 of the edge 6.

Figure 9:
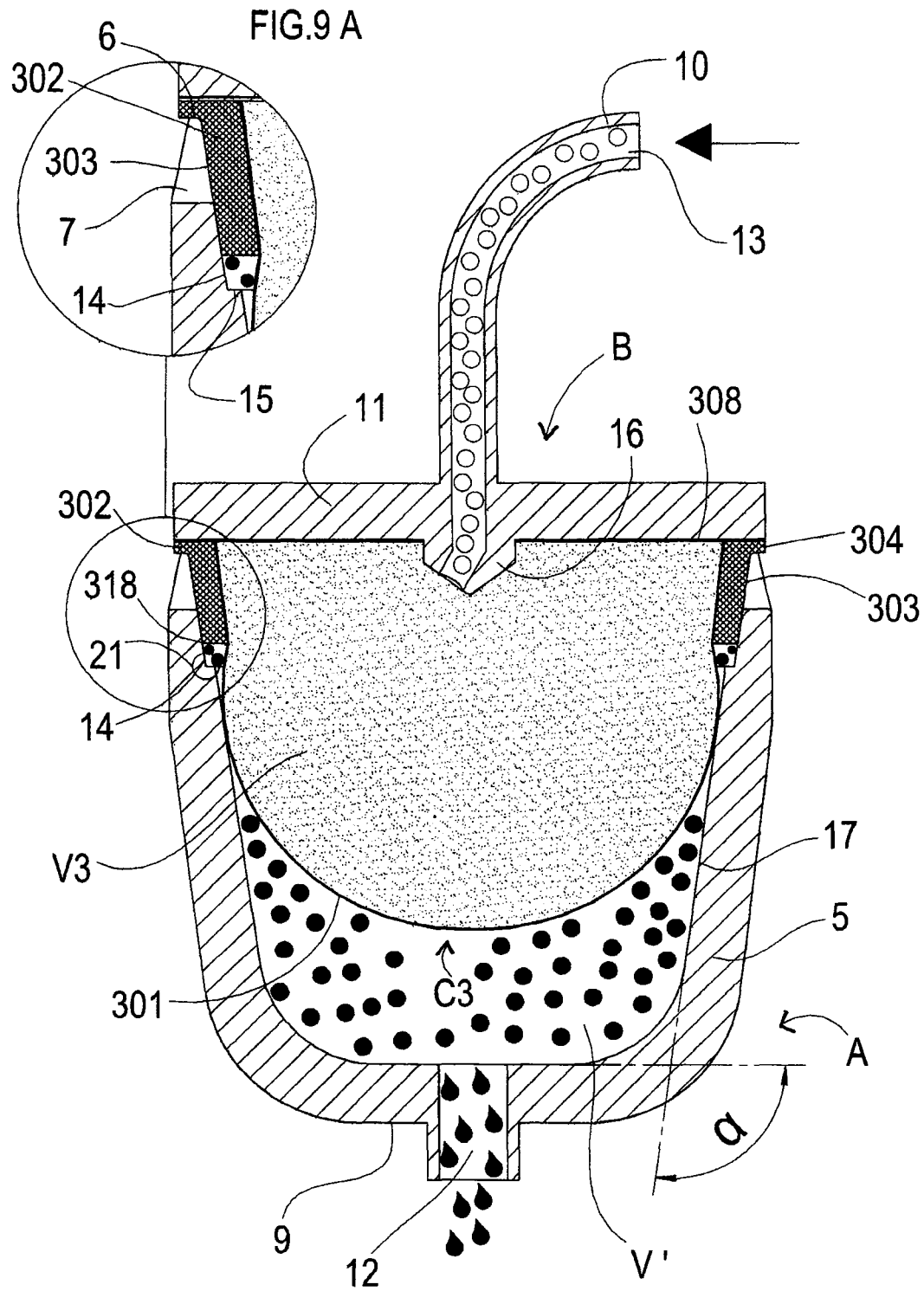
FIG. 9 schematically shows a sectional view of the system for the production of beverages according to a further embodiment of the present invention, in a use step.

FIG. 9 schematically shows a sectional view of the system for the production of beverages according to a further embodiment of the present invention, in a use step.

The system for the production of a beverage comprises a capsule C3 and a container A adapted to house the capsule C3 during the production; the capsule C3 comprises a capsule body 301 made of filtering material, such as filter paper or thermoformable filtering material, adapted to form a containment volume V3 for the product used to obtain the desired beverage, for example ground coffee, and a reinforcement ring 302 comprising a side wall 303 and a ledge 304 protruding from the side wall 303; the container A comprises a lateral surface 5 and a bottom 9, forming a compartment V' adapted to house the capsule C3 during the production; the system is such that the side wall 303 of the reinforcement ring 302 is configured so as to form a seal with the inner surface 17 of the side wall 5 of the container, so as to prevent the leak of the beverage from the interface between the reinforcement ring 302 and the container A.

In the case shown in the figure, the seal between the side wall 303 of the reinforcement ring 302 and the inner surface 17 of the container A is made so that there is contact between the outer wall of the lower portion 318 of the side wall 303 and the upper vertical portion 14 of the step 21 of the inner surface 17. In this case, the entire outer wall of the side wall 303 of the reinforcement ring 302 has an inclination corresponding to the inclination of the upper vertical portion 14 of the step 21 of the inner surface 17 of the container A. More specifically, the profile of the outer surface of the side wall 303 of the reinforcement ring 302 is shaped like a cone, corresponding to the cone-shaped profile of the upper vertical portion 14 of the step 21 of the inner surface 17 of the container A.

FIG. 9A schematically shows a detail of the system shown in FIG. 9.

The figure shows how, unlike the case shown in FIG. 4, the seal between the side wall 303 of the reinforcement ring 302 and the inner surface 17 of the container A prevents the leak of the beverage from the interface between the reinforcement ring 302 and the container A. More specifically, it prevents the leak of the beverage through the one or more recesses 7 of the edge 6.

Figure 10:
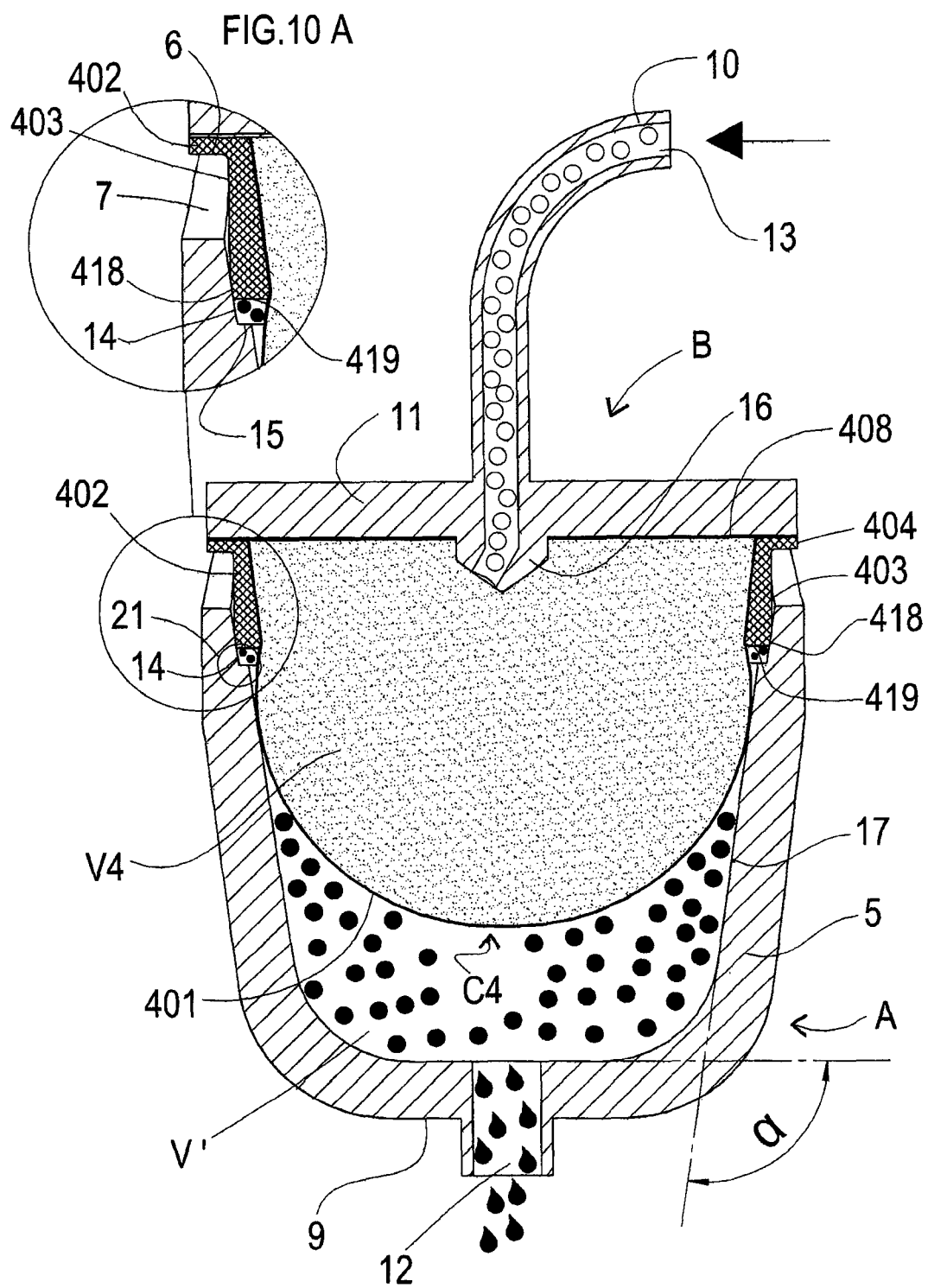
FIG. 10 schematically shows a sectional view of the system for the production of beverages according to a further embodiment of the present invention, in a use step.

FIG. 10 schematically shows a sectional view of the system for the production of beverages according to a further embodiment of the present invention, in a use step.

The system for the production of a beverage comprises a capsule C4 and a container A adapted to house the capsule C4 during the production; the capsule C4 comprises a capsule body 401 made of filtering material, such as filter paper or thermoformable filtering material, adapted to form a containment volume V4 for the product used to obtain the desired beverage, for example ground coffee, and a reinforcement ring 402 comprising a side wall 403 and a ledge 404 protruding from the side wall 403; the container A comprises a lateral surface 5 and a bottom 9, forming a compartment V' adapted to house the capsule C4 during the production; the system is such that the side wall 403 of the reinforcement ring 402 is configured so as to form a seal with the inner surface 17 of the side wall 5 of the container, so as to prevent the leak of the beverage from the interface between the reinforcement ring 402 and the container A.

In the case shown in the figure, the seal between the side wall 403 of the reinforcement ring 402 and the inner surface 17 of the container A is made so that there is contact between the outer wall of the lower portion 418 of the side wall 403 and the upper vertical portion 14 of the step 21 of the inner surface 17. In this case, the outer surface only of the lower portion 418 of the side wall 403 of the reinforcement ring 402 has an inclination corresponding to the inclination of the upper vertical portion 14 of the step 21 of the inner surface 17 of the container A. More specifically, the profile of the outer surface of the lower portion 418 of the side wall 403 of the reinforcement ring 402 is shaped like a cone, corresponding to the cone-shaped profile of the upper vertical portion 14 of the step 21 of the inner surface 17 of the container A.

FIG. 10A schematically shows a detail of the system shown in FIG. 10.

The figure shows how, unlike the case shown in FIG. 4, the seal between the side wall 403 of the reinforcement ring 402 and the inner surface 17 of the container A prevents the leak of the beverage from the interface between the reinforcement ring 402 and the container A. More specifically, it prevents the leak of the beverage through the one or more recesses 7 of the edge 6.

Although the present invention has been described with reference to the embodiments described above, it is clear to the man skilled in the art that several modifications of the present invention may be implemented in the light of the teaching described above and within the scope of the appended claims without departing from the object and the scope of protection of the invention.

For example, although the figures show that the inner wall of the container comprises a step (see reference numeral 21), the step is not essential. The inner wall of the container may in fact be continuous and/or smooth, without steps or other structures. The inner wall may further comprise other structures, such as one or more protruding edges.

Moreover, the container adapted to house the capsule may comprise a second piercing element adapted to pierce the capsule housed therein, for the exit of the beverage. According to the present invention, however, the second piercing element should not be necessarily used since the capsule according to the present invention comprises a capsule body of filtering material which does not need to be pierced to allow the exit of the beverage.

Moreover, the capsule body of filtering material may be smooth or pleated, as shown for example for the capsule C in FIG. 1. Moreover, the capsule body may be made of permeable, filtering and thermoformable material, such as SMASH™ or filter paper or other filtering materials.

Moreover, the reinforcement ring may be made of any suitable materials, such as biodegradable and/or compostable and/or biobased material, such as PLA, PHA, PBS, Starch Blends, biobased PE, PET, PA, PTT.

Moreover, although the capsules, reinforcement rings and containers described all have a round shape, it is clear that the present invention is adaptable to any shape, such as square, rectangular or polygonal.

Also the dimensions of the system may be different although, preferably, the capsule is of the single-dose type.

Finally, those areas that are deemed to be known by the man skilled in the art were not described to avoid excessively uselessly shadowing the invention described.

Accordingly, the invention is not limited to the embodiments described above but is only limited by the scope of protection of the appended claims.

What is claimed is:

1. A method for the production of a beverage by means of an apparatus comprising a capsule and a container adapted to house said capsule during the beverage production; said capsule comprising a capsule body made of filtering material that forms a containment volume for a product used to obtain the beverage, and a reinforcement ring attached to the filtering material, the reinforcement ring comprising a side wall and a ledge protruding from said side wall, wherein said ledge faces towards a conduit for dispensing water under pressure; said container comprising a side wall and a container bottom forming a compartment adapted to house said capsule during the beverage production, the container side wall comprising an upper edge with edge recesses, each of the edge recesses having a bottom edge; wherein an inner surface of said side wall of said container comprises a recess formed by a step comprising a substantially horizontal portion and a substantially vertical portion, said method comprises the following step:

provided a seal between at least a portion of said side wall of said reinforcement ring and an inner surface of said container side wall between the bottom edge of each of the edge recesses and the substantially horizontal portion, so as to avoid a leak of said beverage from between said reinforcement ring and said container, wherein said seal is provided between said side wall of said reinforcement ring and a portion of said substantially vertical portion between the bottom edge of each of the edge recesses and the substantially horizontal portion, such that there is a gap between said side wall of said reinforcement ring and said substantially horizontal portion, introducing water into said capsule body to produce the beverage and then, collecting the beverage in a container.

2. The method for the production of a beverage according to claim 1 further comprising the following step: enclosing said capsule in said compartment during the production of said beverage by means of a closing element.

3. The method for the production of a beverage according to claim 1, wherein the water is introduced into the capsule body is under pressure.

4. An apparatus for the production of a beverage in combination with a capsule comprising the capsule and a container adapted to house said capsule during the beverage production;

said capsule comprising a capsule body made of filtering material that forms a containment volume for a product used to obtain the beverage and a reinforcement ring comprising a reinforcement ring side wall and a ledge protruding from said reinforcement ring side wall, the reinforcement ring attached to the filtering material, wherein said ledge faces towards a conduit for dispensing water under pressure;

said container comprising a container side wall and a bottom forming a compartment adapted to house said capsule during beverage production, the container side wall comprising an upper edge with edge recesses, each of the edge recesses having a bottom edge;

wherein an inner surface of said container side wall comprises a wall recess formed by a step comprising a substantially horizontal portion and a substantially vertical portion, wherein a first container diameter is formed between opposing surfaces of an upper innermost edge of the upper edge of said container side wall and a second container diameter is formed between opposing surfaces of an innermost edge of the substantially horizontal portion of said container side wall, and wherein said reinforcement ring side wall has a length extending from the upper edge of said container side wall to below the bottom edge of each of the edge recesses and the reinforcement ring comprising a distal end with an outer diameter having a dimension ranging from between the first container diameter to the second container diameter and wherein said container and capsule are configured so as to provide a seal at the distal end of said reinforcement ring side wall at a seal location on the substantially vertical portion between the bottom edge of each of the recesses and the substantially horizontal portion such that there is a gap between said distal end of said reinforcement ring and said substantially horizontal portion.

5. The apparatus for the production of a beverage according to claim 4, wherein a portion of said side wall of said reinforcement ring has an inclination corresponding to an inclination of at least a predefined portion of said inner surface of said side wall of said container.

6. The apparatus for the production of a beverage according to claim 4, wherein a profile of a portion of an outer surface of said side wall of said reinforcement ring corresponds to a profile of said inner surface of said side wall of said container.

7. The apparatus for the production of a beverage according to claim 4, wherein said edge recesses facilitate insertion and removal of said capsule from said container.

8. The apparatus for the production of a beverage according to claim 4, wherein the apparatus comprises a closing element, adapted for enclosing said capsule in said compartment during the production of said beverage.

9. The method for the production of a beverage according to claim 2, wherein said step of enclosing said capsule in said compartment during the production of said beverage by means of a closing element comprises the following substep:

applying a force on said capsule in said container so as to guarantee the seal between said side wall of said reinforcement ring and the portion of said substantially vertical portion of said side wall of said container such that there is a gap between said side wall of said reinforcement ring and said substantially horizontal portion.

10. The apparatus for the production of a beverage according to claim 8, wherein said closing element is configured so as to exert a force on said capsule in said container so as to guarantee the contact and thus the seal between said side wall of said reinforcement ring and said substantially vertical portion, such that there is a gap between said side wall of said reinforcement ring and said substantially horizontal portion.

11. An apparatus for the production of a beverage in combination with a capsule, comprising:

a container having a container bottom, a container side wall, a container upper edge forming an open end with container recesses formed along the container upper edge and extending along the container side wall, and a container step in the container side wall between a recess bottom of each of the container recesses and the container bottom, the container step having a horizontal portion and a vertical portion, the vertical portion extending from the recess bottom of the container recesses to the horizontal portion, the vertical portion having a reduced container side wall thickness relative to a remaining portion of the container side wall, wherein a first container distance extends between opposing surfaces of an inner edge of the container upper edge and a second container distance extends between opposing surfaces of an inner edge of the horizontal portion of the container step;

a capsule containing a beverage material placed within said container, said capsule comprising, a capsule body made of a filtering material;

a reinforcement ring attached to the filtering material, said reinforcement ring having a protruding ledge contacting the container upper edge and a reinforcement ring side wall extending transversely from the protruding ledge, the reinforcement ring side wall having a length with a distal end, the length being greater than a distance from the container upper edge to the recess bottom of each of the container recesses and a reinforcement ring sidewall bottom portion at the distal end opposite the protruding ledge, the reinforcement ring sidewall bottom portion having a diameter between the first container distance and the second container distance wherein the distal end at the reinforcement ring sidewall bottom portion seals with the container side wall at the vertical portion between the recess bottom of each of the container recesses and the horizontal portion of the container step, such that there is a gap between said distal end of said reinforcement ring and said horizontal portion;

a sealing element placed over said reinforcement ring and attached to the protruding ledge;

a closing element having a dispensing conduit with a piercing element placed over said sealing element with the protruding ledge of said reinforcement ring facing towards the dispensing conduit; and whereby the apparatus is adaptable to forming a seal and the beverage is prevented from leaking from the container recesses during the production of the beverage.

12. A method for production of a beverage with a capsule containing a product and a container holding the capsule, the container having a closing element with a dispensing conduit, the capsule having a filtering material attached to a reinforcement ring, the reinforcement ring having a reinforcement ring side wall, a ledge protruding from the reinforcement ring side wall on one end, and a reinforcement ring side wall bottom on another end opposite the one end, the container having a container open end with an upper edge having edge recesses each of the edge recesses having a recess bottom, and the container comprising a container bottom, a container side wall extending between the container open end and the container bottom, the container side wall having a first portion with a first sidewall thickness adjacent the container open end with a first container diameter between opposing surfaces of an inner edge of the container open end and a second portion with a second sidewall thickness adjacent the container bottom, the first sidewall thickness being less than the second sidewall thickness with the first and second sidewall thicknesses separated by a horizontal portion having a second container diameter between opposing surfaces of an inner edge of the horizontal portion, the method comprising the steps of:

providing the capsule, wherein the reinforcement ring side wall bottom comprises an outer diameter having a dimension ranging from between the first container diameter and the second container diameter;

inserting the capsule into the container open end so that the reinforcement ring side wall bottom passes through the container open end and the ledge protruding from the reinforcement ring side wall faces towards the dispensing conduit;

pressing the reinforcement ring into the container until the reinforcement ring side wall bottom contacts the first portion of the container side wall at a contact seal location between the recess bottom of each of the edge recesses and the horizontal portion separating the first and second sidewall thicknesses; and maintaining pressure on the capsule held in the container sufficient to form a seal between the reinforcement ring side wall bottom and the contact seal location during the production of the beverage, whereby the seal is formed by the reinforcement ring side wall bottom between the container side wall below the edge recess in the upper edge of the container open end and the horizontal portion, such that there is a gap between said reinforcement ring side wall bottom and said substantially horizontal portion, and so that the seal is located between the container bottom and the recess bottom of each of the edge recesses preventing the beverage from leaking out of the open end of the container past the recesses bottom during the production of the beverage.

13. A system for the production of beverages with a capsule containing a product used to obtain a beverage with the capsule held in a container, comprising:

a plurality of capsules, each one of said plurality of capsules having a filtering material attached to a reinforcement ring and containing a product used to obtain a beverage, the reinforcement ring having a reinforcement ring side wall and a protruding ledge extending radially from an upper end of the reinforcement ring side wall, the reinforcement ring side wall having a lower portion end opposite the upper end of the reinforcement ring side wall, the lower portion end of the reinforcement ring side wall having an outer circumference with a lower portion outer diameter;

a container dimensioned to receive one of said plurality of capsules, said container having an inner side wall with an upper edge and a bottom, a plurality of recesses extend from the upper edge towards the bottom, the upper edge having an upper innermost edge forming a first opening having an upper innermost edge diameter, a horizontal portion extending radially inward from the inner side wall forming a step and an upper vertical portion between the step and the upper innermost edge, the horizontal portion having a step innermost edge forming a second opening having a step innermost edge diameter; and wherein at least two of said plurality of capsules have the outer circumference of the reinforcement ring with a different diameter from each other for the lower portion outer diameter of the reinforcement ring side wall, with the different diameter ranging from between the upper innermost edge diameter of the upper edge of the inner side wall of the container and the step innermost edge diameter of the horizontal portion extending radially inward from the inner side wall of said container, whereby a seal is formed between the plurality of recesses and the step on the inner side wall of said container by a surface of the outer circumference of the lower portion end of the reinforcement ring side wall when one of said plurality of capsules is placed in said container, such that there is a gap between the lower portion end of the reinforcement ring side wall and said horizontal portion, and with the seal preventing a beverage from leaking out of the plurality of recesses during production of a beverage.

14. The system for the production of beverages with a capsule containing a product used to obtain a beverage with the capsule held in a container as recited in claim 13 wherein:

the upper vertical portion angles radially outward from the step to the plurality of recesses.

15. A method for the production of beverages with a capsule containing a product used to obtain a beverage with the capsule held in a container, comprising:

forming a plurality of capsules, each one of the plurality of capsules having a filtering material attached to a reinforcement ring and containing a product used to obtain a beverage, the reinforcement ring having a reinforcement ring side wall and a protruding ledge extending radially from an upper end of the reinforcement ring side wall, the reinforcement ring side wall having a lower portion end opposite the upper end of the reinforcement ring side wall, the lower portion end of the reinforcement ring side wall having an outer circumference with a lower portion outer diameter;

providing a container dimensioned to receive one of the plurality of capsules, the container having an inner side wall with an upper edge and a bottom, a plurality of recesses extend from the upper edge towards the bottom, the plurality of recesses each comprising a recess bottom, the upper edge having an upper innermost edge forming a first opening having an upper innermost edge diameter, a horizontal portion extending radially inward from the inner side wall forming a step and an upper vertical portion between the step and the upper innermost edge, the horizontal portion having a step innermost edge forming a second opening having a step innermost edge diameter;

wherein in said step of forming the plurality of capsules at least two of the plurality of capsules have the outer circumference of the reinforcement ring with a different diameter from each other for the lower portion outer diameter of the reinforcement ring side wall, with the different diameter ranging from between the upper innermost edge diameter of the upper edge of the inner side wall of the container and the step innermost edge diameter of the horizontal portion extending radially inward from the inner side wall of said container; and inserting one of the plurality of capsules in the container forming a seal between the recess bottom of the plurality of recesses and the step on the inner side wall of the container with a surface of the outer circumference of the lower portion end of the reinforcement ring side wall, such that there is a gap between the lower portion end of the reinforcement ring side wall and the substantially horizontal portion, and whereby the seal prevents a beverage from leaking out of the plurality of recesses during production of a beverage.

* * * * *